United States Patent [19]

Nakayama

[11] Patent Number: 5,171,362
[45] Date of Patent: Dec. 15, 1992

[54] CONCRETE CONSTRUCTION MATERIAL AND METHOD ADAPTED TO PREVENT CHEMICAL CORROSION OF METALS LOCATED ADJACENT THERETO

[75] Inventor: Norio Nakayama, Tsukuba, Japan

[73] Assignee: Director-General of Agency of Industrial Science and Technology, Japan

[21] Appl. No.: 729,342

[22] Filed: Jul. 12, 1991

[30] Foreign Application Priority Data

Aug. 9, 1990 [JP] Japan ................................. 1-211246

[51] Int. Cl.⁵ ............................................. C04B 9/02
[52] U.S. Cl. .............................. 106/14.12; 252/389.22; 252/389.23
[58] Field of Search .................. 106/14, 12, 644, 700; 252/389.22, 389.23

[56] References Cited

U.S. PATENT DOCUMENTS

| | | | |
|---|---|---|---|
| 3,429,724 | 2/1969 | Keenum et al. | 106/733 |
| 4,040,854 | 8/1977 | Persinski et al. | 106/717 |
| 4,206,075 | 6/1980 | Boffardi | 252/389.22 |
| 4,225,361 | 9/1980 | Joseph | 106/776 |
| 4,557,896 | 12/1985 | Brocklebank et al. | 422/14 |
| 4,904,413 | 2/1990 | Hoots et al. | 252/398.23 |
| 4,964,917 | 10/1990 | Bobrowski et al. | 106/804 |
| 5,071,579 | 12/1991 | Johnston | 252/70 |

Primary Examiner—William R. Dixon, Jr.
Assistant Examiner—Margaret Einsmann
Attorney, Agent, or Firm—Lorusso & Loud

[57] ABSTRACT

A construction material including a concrete body, a metallic material embedded within the concrete body, and an organophosphorus compound, such as an organic phosphonic acid or a salt thereof, dispersed within the concrete body. Chemical corrosion of pipes or the like metals extending from such a construction material into an environment which is less alkaline an the concrete body, such as soil, can be prevented by incorporation of the organic phosphorus material.

5 Claims, 4 Drawing Sheets

CONCRETE CONSTRUCTION MATERIAL AND METHOD ADAPTED TO PREVENT CHEMICAL CORROSION OF METALS LOCATED ADJACENT THERETO

BACKGROUND OF THE INVENTION

This invention relates to a construction material including a concrete body and a metallic material and adapted for preventing or minimizing chemical corrosion of metal pipes extending therefrom and a method of producing same. The present invention is also directed to a method of preventing such chemical corrosion.

It is known that iron pipes such as city gas pipes in soil or water are corroded when such pipes are electrically contacted with reinforced concrete of buildings. Such corrosion, which is termed macrocell corrosion, is considered to result from the creation of a difference in electrical potential between the reinforcing bars of the reinforced concrete and the gas pipes, which is caused by a difference in hydrogen-ion concentration between the concrete body within which the reinforcing bars are embedded and the soil or water in which the gas pipes are present.

FIG. 3 of the accompanying drawings schematically illustrates the above macrocell corrosion phenomenon. The reference numeral 1 denotes a concrete wall within which reinforcing bars 6 are embedded. A gas pipe 2 extends through the wall 1 into soil 3. Since the alkalinity of the concrete wall 1 is higher than that of the soil 3, the electrical potential of the reinforced bars 6 is higher than that of the gas pipe 3, so that a macrocell current flows as shown by the arrow 5. Corrosion of the gas pipe 2 occurs at a portion 4 from which the current flows into the soil 3. Such a macrocell current is generated even when the gas pipe 2 is not directly contacted with the reinforcing bars 6.

One known method for the prevention of the corrosion of pipes due to such a macrocell current is illustrated in FIG. 4, in which the same reference numerals as those in FIG. 3 designate similar component parts. In this method, that portion of the gas pipe 2 which is located in the soil 3 is surrounded by an insulating layer 8 such as a polyethylene resin coating to prevent a current from flowing from the pipe 2 to the soil 3. Also, a bore 7 is formed in the concrete wall 1 to prevent the pipe 2 from electrically contacting with the concrete wall 1 and with the reinforcing bars 6.

This method is not fully satisfactory from the standpoint of economy because it is troublesome to form the bores 7 in the wall 1 and to provide the insulating layer around the pipes 2. Further, when the insulating layer 8 is injured for some reasons, a macrocell current, if generated, will concentrically flow at the injured portion so that the corresponding portion of the gas pipe 2 is more susceptible to corrosion.

It is known to incorporate a nitrite into a concrete body so as to prevent the corrosion of the reinforcing bars embedded therewithin. This technique is useless in preventing the occurrence of macrocell current, i.e. in preventing the corrosion of gas pipes extending from the concrete body.

SUMMARY OF THE INVENTION

It is, therefore, the prime object of the present invention to provide a construction material which includes a concrete body and a metallic material embedded within the concrete body and which can prevent or minimize the corrosion of metals extending therefrom into soil or water.

Another object of the present invention is to provide a method effective to prevent macrocell corrosion of metals.

In accomplishing the foregoing objects, there is provided in accordance with the present invention a construction material comprising a concrete body, a metallic material embedded within said concrete body, and an organophosphorus compound dispersed within said concrete body.

The present invention provides a method of producing a construction material, comprising the steps of:
providing a hardenable composition containing cement, sand and water;
mixing an organophosphorus compound with said composition to obtain a mixture, the amount of said organophosphorus compound being 0.0001–0.1% based on the weight of the cement;
placing a metallic material in position;
forming said mixture into a desired shape with said metallic material being surrounded by said mixture; and
then hardening said mixture.

In a further aspect, the present invention provides a method of preventing the corrosion of a first metallic material located in an environment outside of a construction material which comprises an alkaline structural body and a second metallic material embedded within said structural body and electrically contacted with said first metallic material, said environment being neutral, acidic or less alkaline than said alkaline structural body, said method being characterized in that an organophosphorus compound is dispersed within said alkaline structural body in an amount effective to suppress the occurrence of a cathodic reaction resulting in the formation of hydroxy ion on said second metallic material.

When a metallic material M with a valency m is placed in an alkaline environment, the following cathodic reaction (1) and anodic reaction (2) generally take place on its surface:

$$O_2 + 2H_2O + 4e^- \rightarrow 4OH^- \quad (1)$$

$$M \rightarrow M^{m+} + me^- \quad (2)$$

FIG. 2 shows the relationship between the electrical potential in the metallic material and the electrical current (i.e. reaction rate) resulting from each of the two reactions (1) and (2), in which Curves 11 and 12 are for the cathodic and anodic reactions (1) and (2), respectively. The two reactions (1) and (2) are in the stationary state at the intersection of Curves 11 and 12, where the metallic material shows the electrical potential $E_1$.

When the metallic material is subjected to more alkaline conditions, the metal ions $M^{m+}$ produced by the reaction (2) react with the hydroxy ion formed by the reaction (1) to form hydroxide $M(OH)_m$. The hydroxide forms a dense layer on the metal surface to inhibit the reaction (2). As a result, the anodic current is changed as shown by Curve 13 so that the electrical potential of the metallic material is shifted toward noble side and shows $E_2$. Thus, when two metallic materials are placed in environments with different alkalinity from each other, there is caused a difference $(E_2-E_1)$ in electrical potential. This accounts for the occurrence of a macrocell current. In this case, the reaction (1) mainly proceeds in the more alkaline environment, while the reaction (2) is the main reaction in the less alkaline environment. The macrocell corrosion of the metallic material in the less alkaline environment proceeds based on the reaction (2). When the metallic material in the more alkaline environment has a large surface area, such as reinforcing bars of a fero-concrete material, the corrosion becomes significant.

In the present invention, an organophosphorus compound is incorporated into an alkaline structural body in which a metallic material is embedded, to inhibit the occurrence of a cathodic reaction resulting in the formation of hydroxy ion. Thus, by the addition of the phosphorus compound, the cathodic current is changed as shown by Curve 14 in FIG. 2, so that the electrical potential of the metallic material is shifted toward ignoble side and shows $E_3$. As a result, the potential difference $(E_3-E_1)$ is much reduced as compared with the case in which the organophosphorus compound is not incorporated $(E_2-E_1)$.

The organophosphorus compound incorporated into the alkaline structural body is considered to serve to protect the metallic material within the structural body from contacting with oxygen so that the cathodic reaction (1) resulting in the production of hydroxy ions is inhibited.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENT OF THE INVENTION

In the present specification, the term "concrete body" is intended to refer to a hardened mass of mortar or concrete. The concrete body which is a representative of an alkaline structural body may be obtained from a composition containing a cement, sand, water and optionally an aggregate and additives. The construction material according to the present invention includes the concrete body, a metallic material such as reinforcing iron bars embedded within the concrete body, and an organophosphorus compound dispersed in the concrete body.

The organophosphorus compound is preferably an organic phosphonic acid or a salt thereof for reasons of good dispersibility into unhardened mortar or concrete. The use of the organic phosphonic acid or its salt is also preferred because the adsorption thereof on the metallic material is facilitated by the calcium carbonate which has deposited on the metallic material as a result of the reaction of (a) calcium ion from the concrete body with (b) hydroxy ion formed by the cathodic reaction and (c) carbon dioxide in the air, so that the hydroxy ion-forming cathodic reaction is effectively inhibited from proceeding.

Examples of suitable organic phosphonic acid include aminomethylenephosphonic acid of the formula:

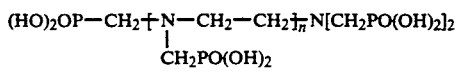

where n is an integer of 0–5, 1-hydroxyethylidene-1,1-diphosphonic acid of the formula:

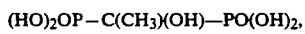

aminomethylphosphonic acid of the formula:

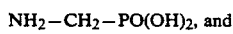

1-aminoethyl-phosphonic acid of the formula:

The organophosphorus compound is preferably used in conjunction with a source of zinc ion such as zinc nitrate to facilitate the adsorption of the organophosphorus compound onto the surface of the metallic material.

The organophosphorus compound is preferably used in an amount of 0.0001 to 0.1% by weight, more preferably 0.001–0.1% by weight, based on the amount of the cement used for forming the concrete body.

The construction material according to the present invention may be obtained by mixing the above-described organophosphorus compound with cement, sand, water and optionally an aggregate and other additives to form a hardenable mixture, forming the mixture into a desired shape with a metallic material such as reinforcing bars being embedded within the mixture, and then hardening the mixture.

The following examples will further illustrate the present invention.

EXAMPLE 1

Figure 2:
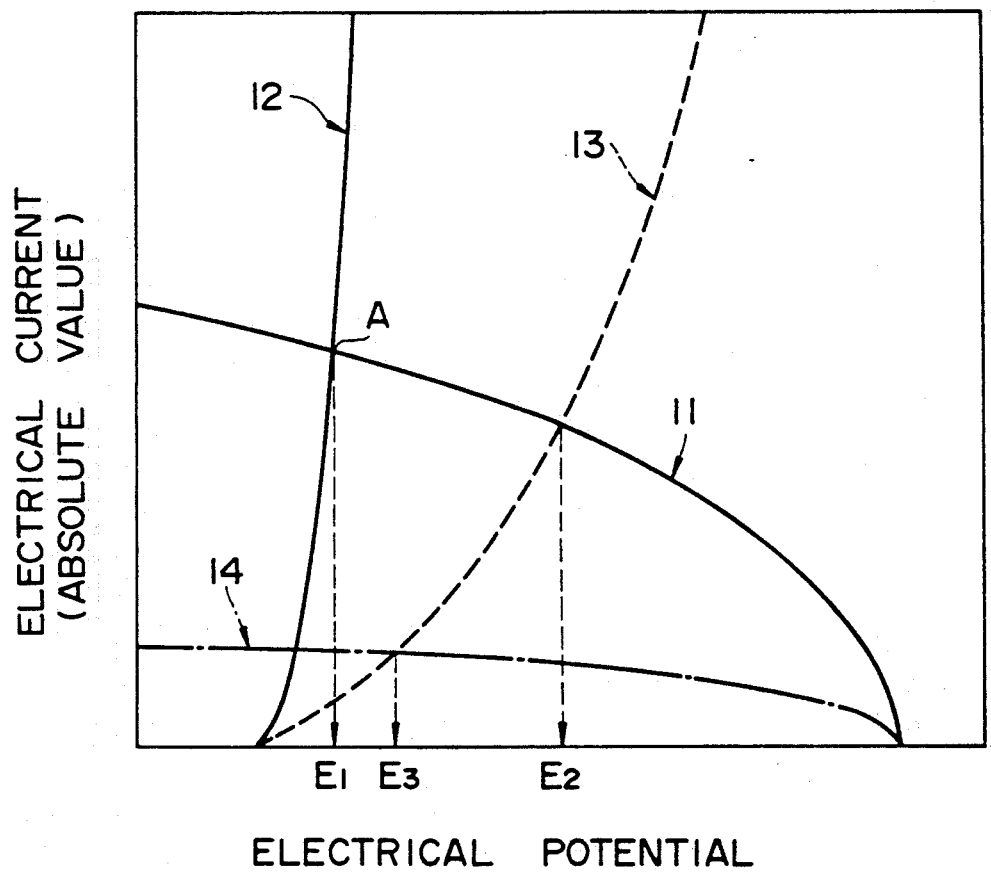
FIG. 2 is a graph showing the relationship between the electrical potential and the current in cathodic and anodic reactions on the surface of a metal.
Figure 3:
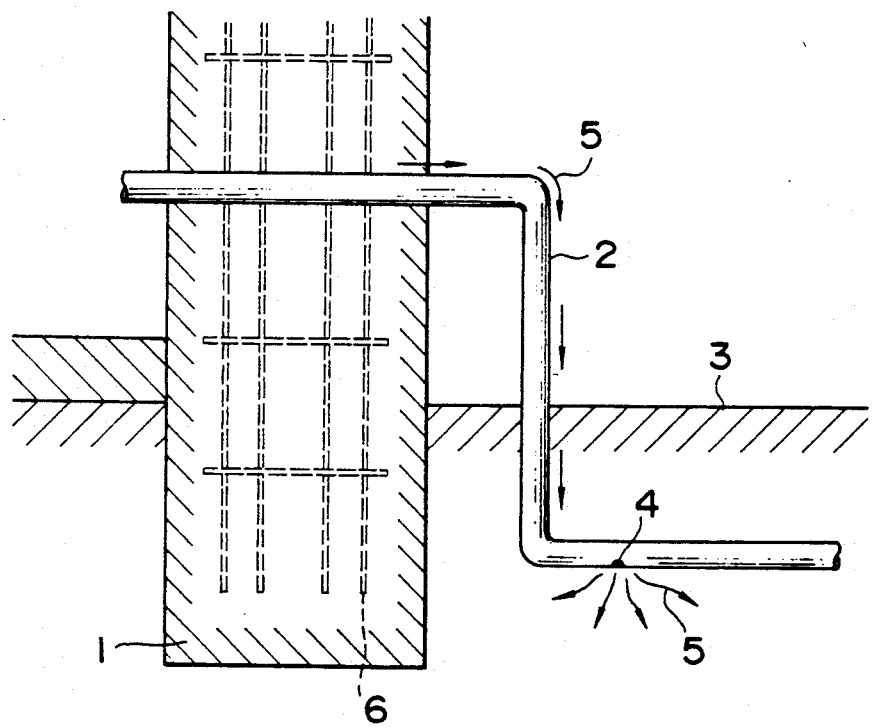
FIG. 3 is a sectional view schematically showing the macrocell corrosion phenomenon caused in a city gas pipe extending through a reinforced concrete wall of a building.
Figure 4:
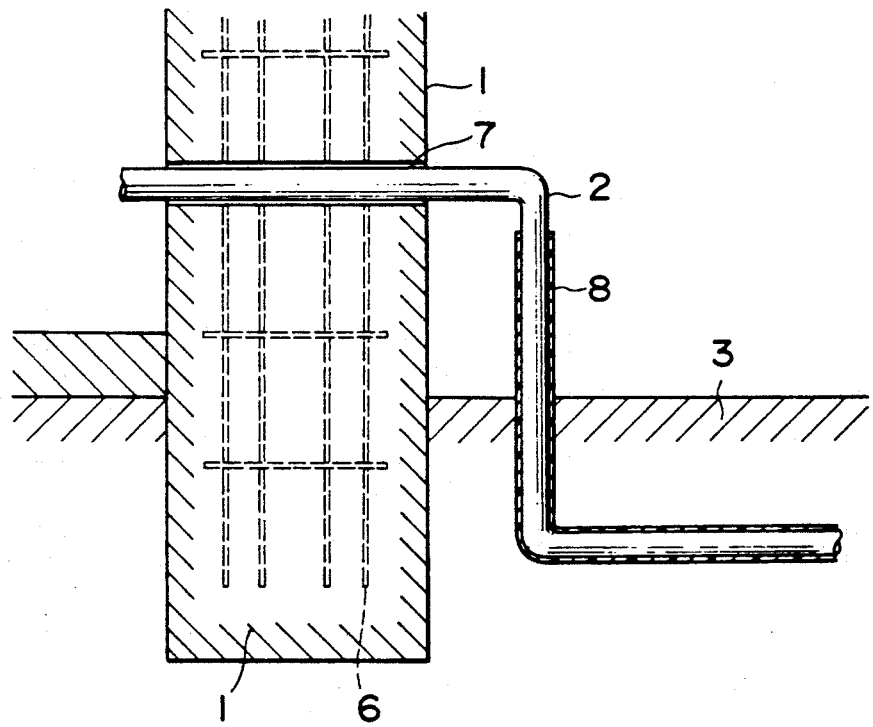
FIG. 4 is a sectional view similar to FIG. 3 showing the conventional arrangement for preventing macrocell corrosion.

As a model pore water in concrete, an aqueous Ca(OH)$_2$ solution having a pH of 12.6 was used. Into this solution was dissolved aminomethylenephosphonic acid in amounts of 0.0008, 0.008, 0.08 and 0.8 % by weight to obtain four sample solutions. An iron bar for use as a reinforcing bar for the formation of fero-concrete and a platinum electrode were immersed in each of the sample solutions to measure the electrical current flowing between the bar and the electrode at various electrical potential of the bar, thereby obtaining first, potential-current curves, similar to Curve 14 in FIG. 2, at various aminomethylenephosphonic acid concentrations. In this case, a reference electrode was used. The electrical potential of the bar is a potential relative to the reference electrode. The electrical potential of the bar was varied using a potentiostat.

As a model water in soil, an aqueous solution containing $5.0 \times 10^{-2}$ M Na$_2$SO$_4$ (pH: 7) was used. A city gas pipe fragment was immersed in this solution together with a platinum electrode and a second, potential-current curve similar to Curve 12 in FIG. 2 was generated in the same manner as above.

Figure 1:
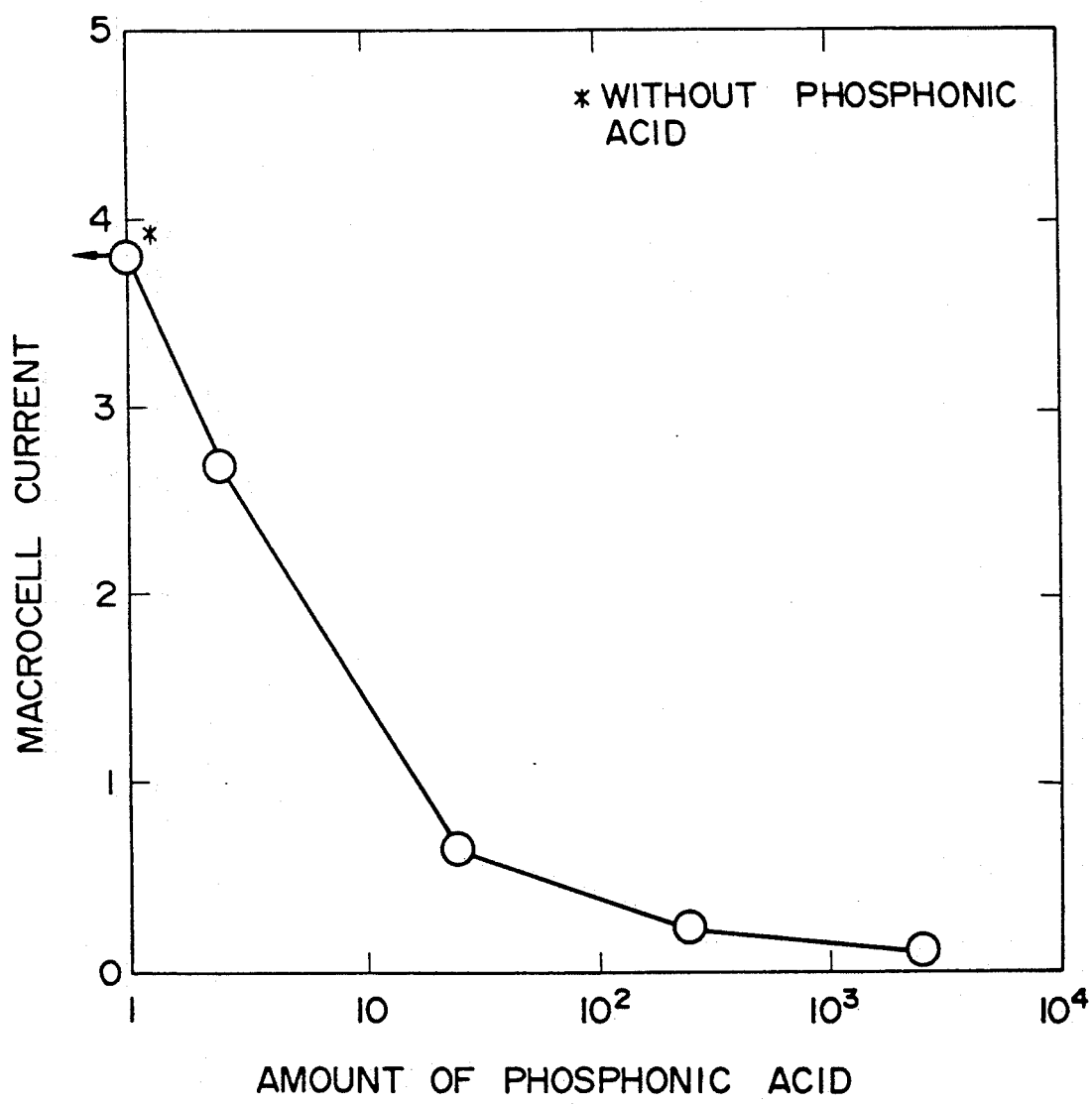
FIG. 1 is a graph showing the relationship between the amount of an organophosphorus compound and the macrocell current.

From the thus obtained first and second potential-current curves, the macrocell currents at various phosphonic acid concentrations were obtained. The relationship between the macrocell current and the phosphonic acid concentrations are shown in FIG. 1. The macrocell current is a value of the current at the intersection of the first and second curves. In the graph shown in FIG. 1, the macrocell current is expressed in values relative to the value of the Ca(OH)$_2$ solution containing no phosphonic acid as a standard and the amount of the phosphonic acid is expressed in relative values.

From the results shown in FIG. 1, it is apparent that the addition of the phosphonic acid is effective in preventing the macrocell corrosion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of preventing the corrosion of a first metallic material located in an environment outside of a construction material which comprises an alkaline structural body and a second metallic material embedded with in said structural body and electrically contacted with said first metallic material, said environment being neutral, acidic or less alkaline than said alkaline structural body, said method comprising dispersing an organic phosphonic acid or a salt thereof within said alkaline structural body in an amount effective to suppress the occurrence of a cathodic reaction resulting in the formation of hydroxy ion on said second metallic material.

2. A method according to claim 1, wherein said first metallic material is an iron or steel pipe, said alkaline structural body is formed of concrete, said second metallic material is formed of iron or steel and said environment is water or soil.

3. A method according to claim 1, wherein said organic phosphonic acid is a compound selected from the group consisting of aminomethylenephosphonic acid, 1-hydroxyethylidene-1,1-diphosphonic acid, aminomethylphosphonic acid and 1-aminoethylphosphonic acid.

4. The method of claim 8 further comprising dispersing a source of zinc ion along with said organic phosphonic acid or salt thereof within said alkaline structural body.

5. The method of claim 4 wherein said zinc ion source is zinc nitrate.

* * * * *

UNITED STATES PATENT AND TRADEMARK OFFICE
CERTIFICATE OF CORRECTION

PATENT NO. : 5,171,362

DATED : December 15, 1992

INVENTOR(S) : NAKAYAMA et al

It is certified that error appears in the above-identified patent and that said Letters Patent is hereby corrected as shown below:

Col. 6, line 21, delete "8" and insert --1--.

Signed and Sealed this

Twenty-third Day of November, 1993

*Attest:*

BRUCE LEHMAN

*Attesting Officer*    *Commissioner of Patents and Trademarks*